Aug. 28, 1956  H. E. NEUBAUER ET AL  2,760,791
PRESSURE SEAL CONSTRUCTION FOR ROTATING MEMBERS
Filed Nov. 30, 1950  4 Sheets-Sheet 1
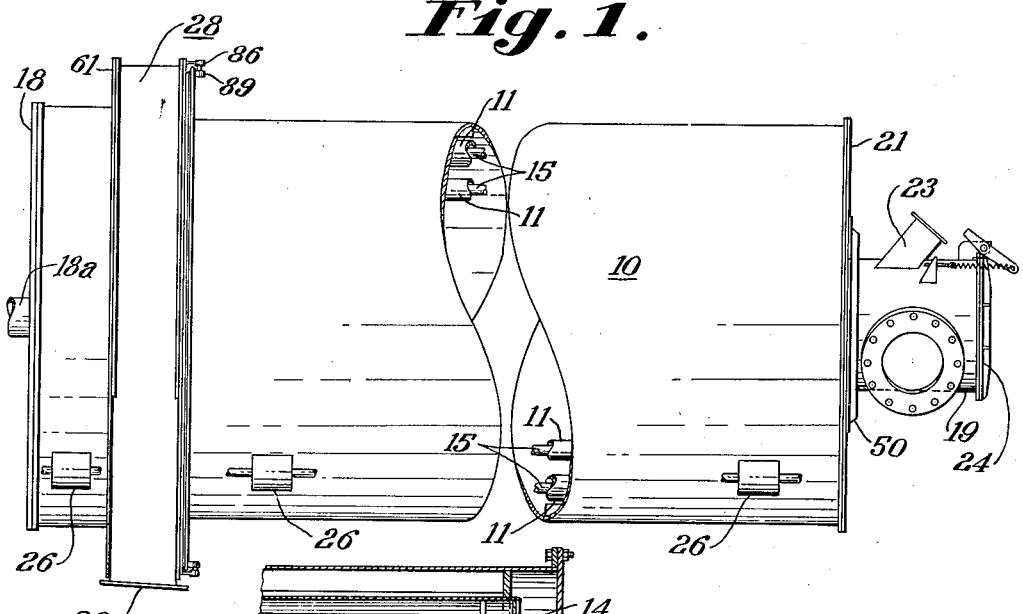
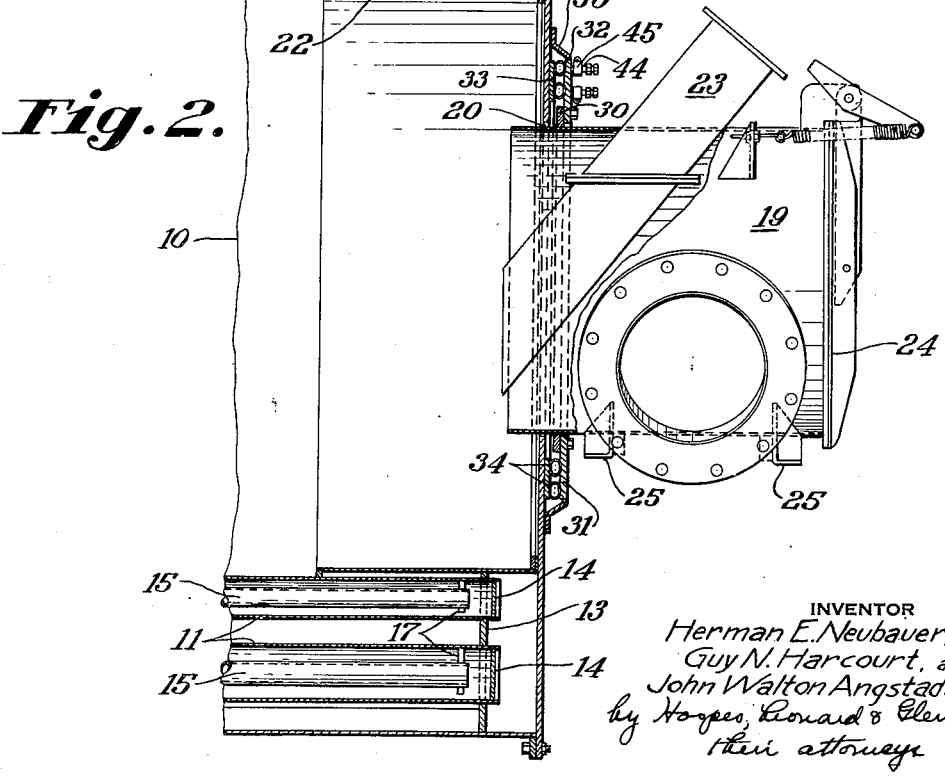
INVENTOR
Herman E. Neubauer, and
Guy N. Harcourt, and
John Walton Angstadt
by Harper, Leonard & Glenn
their attorneys Aug. 28, 1956   H. E. NEUBAUER ET AL   2,760,791
PRESSURE SEAL CONSTRUCTION FOR ROTATING MEMBERS
Filed Nov. 30, 1950   4 Sheets-Sheet 2

INVENTOR
Herman E. Neubauer, and
Guy N. Harcourt, and
John Walton Angstadt
by Hooper, Leonard & Glenn
their attorneys

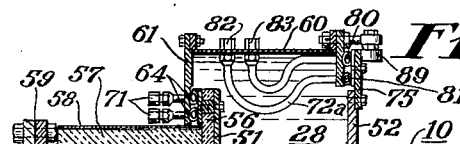
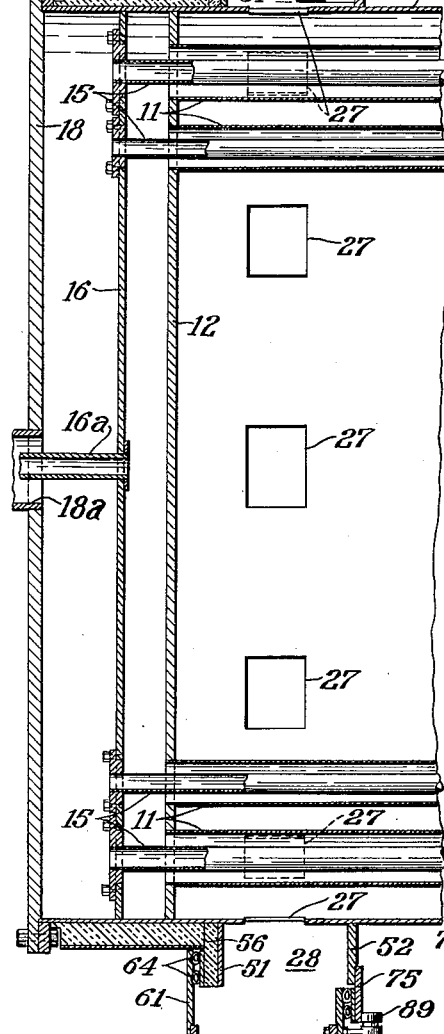
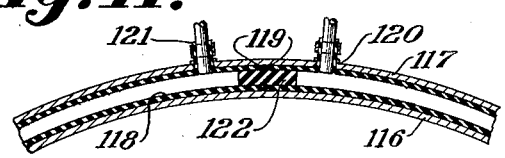
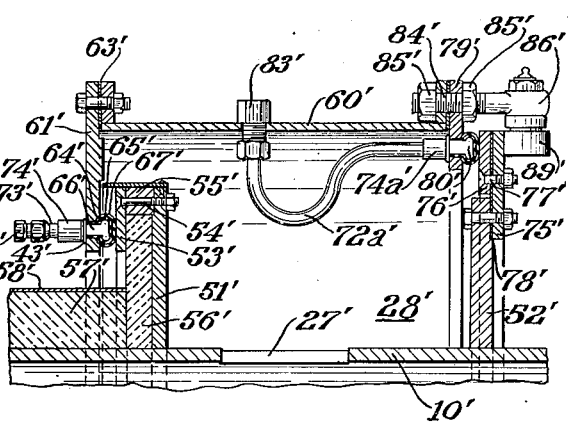

INVENTOR
Herman E. Neubauer,
Guy N. Harcourt, and
John Walton Angstadt
by Hooper, Leonard & Glenn
their attorneys

United States Patent Office 2,760,791
Patented Aug. 28, 1956

2,760,791

PRESSURE SEAL CONSTRUCTION FOR ROTATING MEMBERS

Herman E. Neubauer and Guy N. Harcourt, Buffalo, and John Walton Angstadt, Kenmore, N. Y., assignors, by mesne assignments, to Blaw-Knox Company, Pittsburgh, Pa., a corporation of Delaware Application November 30, 1950, Serial No. 198,342

7 Claims. (Cl. 285—96)

This invention relates to a dust or a dust and vapor tight sealing enclosure construction for processing equipment. More particularly, it relates to a flexible sealing enclosure for use between rotatable and non-rotatable portions of such equipment.

In many cases in processing equipment it is a matter of primary importance to prevent escape of dust or dust and vapor from the equipment. Thus, for example, dryers used in the chemical field having a rotatable cylinder are commonly provided with seals around the cylinder openings to mitigate the possibility of such escape. In one common practice employing a cylindrical feed housing in coaxial relation to the rotatable cylinder, it is usual to provide a stuffing box with spring loaded packing and flexible diaphragm arrangement to seal the opening between the exterior of the feed housing and the adjacent edge of the opening into the cylinder and take care of any relative eccentricity that may be present. No matter how true such surfaces may be made, it is the normal experience that relatively extensive leakage occurs. Any such spring-loaded packing has the further disadvantage that in most cases it bears and wears relatively unevenly, making the task of sealing that much more difficult. Whenever the atmosphere within the processing equipment is of a potentially inflammable nature the need for more certain sealing becomes imperative to prevent escape of these inflammable vapors which must be confined to guard against fire risk and against expensive losses of valuable material.

In the novel construction of this invention, a much tighter seal relatively speaking is provided with at the same time the provision of means for maintaining a complete and continuous sealing enclosure. In such provision of a continuous flexible hollow sealing enclosure, novel connections are used which maintain the integrity of the seal while permitting the circulation of a fluid therethrough. This fluid may be applied under pressure which serves to inflate the flexible sealing means and exert necessary pressure to maintain a tight seal regardless of any slight unevenness of the member of the revolving structure against which the flexible member presses. The fluid also acts as a coolant to remove some of the heat caused by friction between the stationary and rotating members. By providing two stationary flexible sealing enclosure members the space between them can be filled with inert gas at a pressure slightly higher than the pressure in the revolving structure, thereby positively preventing any escape of gases or vapors from the interior of the revolving structure and any entrance of air therein. The construction of this invention permits greater tolerance in the relative machining and positioning of the parts of the equipment involved; is readily assemblable; and relatively long lived and trouble free. Other objects and advantages will be apparent from the following description and drawings, which are illustrative only, in which Figure 1 is a schematic view on a reduced scale of a rotary dryer of the tubular type to which one embodiment of this invention has been applied at its two ends;

Figure 2 is an enlarged view in section of a portion of the feed end of the dryer equipment shown in Figure 1 illustrating a seal construction of this invention;

Figure 5 is a side view in section of a portion of the outlet end of the dryer equipment shown in Figure 1 illustrating a seal construction of this invention at that end;

Figure 9 is an enlarged view in section taken along line IX—IX of Figure 8;

Figure 10 is a view of a seal construction of this invention which may be applied to seal the opening between the discharge housing and rotatable cylinder of a rotary dryer of the vacuum type; and Figure 11 is a view in section of a portion of a modified seal construction of this invention applied to relatively rotatable opposed cylindrical surfaces.

Figure 3:
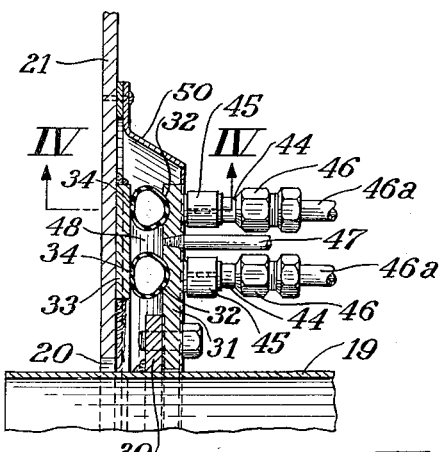
Figure 3 is a further enlarged view of the upper portion of the seal construction shown in Figure 2.

Referring to Figures 1 to 6 inclusive, there may be provided for use with the seal construction of this invention a rotary dryer of a tubular type having a horizontal rotating drum 10 within which there is a plurality of longitudinally extending heating and condensate return tubes 11. The ends of tubes 11 are welded or otherwise affixed in sealed relation to the tube sheet 12 at the outlet end of drum 10. An annular retainer plate 13 adjacent the inlet end of drum 10 supports tubes 11 which are blanked off at that end by plugs 14. Steam inlet pipes 15 are supported by a header 16 at the outlet end of drum 10 and by spider hangers 17 adjacent the inlet end in concentric relation to the respective heating tubes 11. A cover 18 is bolted over the outlet end of drum 10 in spaced relation to header 16. A heating fluid such as steam is supplied through a pipe 18a to the space between cover 18 and header 16 whence it passes into the axially extending steam tubes 15. The steam, condensate and air return occurs between the exterior of the pipes 15 and the interior of the surrounding pipes or tubes 11. Such return products empty into the space between header 16 and tube sheet 12 from whence they are withdrawn through pipe 16a which extends through the center of pipe 18a. These pipes 16a and 18a are connected outside of the dryer to a flexible "Johnson" rotary steam joint which is not illustrated.

At the inlet end of drum 10 a feed cylinder 19 is provided in general concentric relation to the seal of drum 10. The discharge end of feed cylinder 19 extends through an opening 20 in an annular cover 21 at the inlet end of drum 10. A cylindrical baffle 22 may be fastened to cover 21 to assist in guiding material to be dried toward the discharge end of the drum. Such material is passed into drum 10 through an inclined feed chute 23 or conveyor. A hinged door 24 affords access to the drum whenever it may be required. Pedestals (not shown) mounted on the floor of the plant are bolted to the brackets 25 and support feed cylinder 19 and chute 23 in a fixed stationary position. Drum 10 itself is mounted on rollers 26 and rotates about its center line. Helical or inclined vanes (not shown) may be provided inside of the drum to cause the material being dried to move toward the discharge end thereof.

Adjacent the discharge end of drum 10, a succession of circumferential discharge ports 27 are provided. These ports empty into a discharge housing 28, which housing is also stationary and supported by plates or brackets (not shown) fastened to the plate floor. Discharge housing 28 surrounds the circumferential ports 27 and is provided with a discharge opening 29 for the dried material which falls out through the ports 27 during the continued rotation of drum 10. No claim is made in this application to the feeding, heating or discharging of such dryers.

With dryers such as the one which has just briefly been described, the problem of sealing between the stationary and the rotatable parts respectively is solved by the seal construction of this invention. Thus, as shown more particularly in Figures 2, 3 and 4, by the practice of this invention a complete sealing enclosure can be obtained relatively simply and effectively at the inlet end between the feed cylinder 19 and the cover 21 of the rotatable drum 10. In this new seal, feed cylinder 19 is provided with annular flange 30 to which an annular or discoidal supporting ring 31 is bolted. The flange 30 is usually welded to the exterior of cylinder 19. A pair of concentric grooves 32 are provided in supporting ring 31 in the space between ring 31 and cover 21. Opposite such grooves a wear plate 33 is welded to the outside of cover 21. Such wear plate is made in the form of a ring so that during the rotation of drum 10, it remains in opposed relation to the grooves 32 on the supporting plate 31.

In general, such surfaces provided by the supporting plate 31 and wear plate 33 respectively will be discoidal or they may be in the form of two concentric cylinders, permitting the rotating body to expand in an axial direction and permit a telescoping action of the two cylinders in relation to each other while retaining a tight seal. However, the bearing portion of supporting plate 32 for the sealing enclosure may be irregular or polygonal or otherwise shaped so long as it is continuous and completely encloses the exterior of feed cylinder 19 and the opening 20 respectively with wear plate 33 being of comparable dimension so that upon any rotation of the part of the equipment to which it is attached, it remains in opposed relation to all parts of the sealing enclosure borne by the supporting plate 31. The wear plate may be made of stainless steel highly polished on its sealing surface. In some cases it may be desirable to plate the sealing surface thereof with chromium or other suitable metal.

The sealing enclosure itself of this invention comprises a resilient tube 34, preferably made of a rubberlike material, which is normally cemented by a suitable adhesive to a groove 32. The provision in the embodiment disclosed in Figures 1 to 6 of a pair of concentric grooves 32 provides a pair of complete sealing enclosures in concentric relation to each other.

Figure 4:
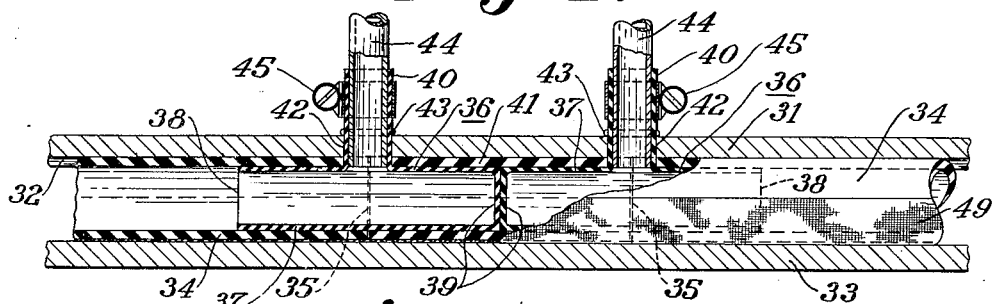
Figure 4 is an enlarged view in section of the seal construction taken along line IV—IV of Figure 3.

The sealing enclosure in this embodiment is completed, as shown in Figure 4. Thus, the ends 35 of each tube 34 are separated by a space and at the same time they are in alignment along the center line of the sealing enclosure through the interior of the respective tubes 34. A unitary T-shaped end member 36, also preferably made of a resilient material, has an aligned portion 37 comprising the head of the T, one end 38 of which is open and the other end 39 of which is closed. The stem 40 of the T is also open and in direct communication with the interior of head 37. The dimensions of end member 36 as to all of the branches thereof fit and are adapted to ready assembly with the tubes 34 and the supporting plates 31.

It will thus be seen that if the open end 38 of an end member 36 is inserted into each end 35 of a tube 34, the closed ends 39 of the end members 36 in alignment in the particular sealing enclosure will abut in back-to-back fashion and substantially complete in the sense of making the sealing enclosure continuous around the opening to be sealed. In the particular embodiment being described, such end members complete 360° of the enclosure in each of the concentric sealing spaces between a groove 32 and the portion of the wear plate 33 opposite thereto. While such grooves 32 are desirable for seating of the respective tubes 34, they are not essential inasmuch as some adhesives will hold such sealing enclosures directly to the metal surface of a supporting plate, such as supporting plate 31, without any provision of grooves therein.

A resilient sleeve 41, preferably seamless and jointless and made of a rubberlike material, is also provided to fit over the ends 39 of abutting end members 36. The dimensions of sleeve 41 are such that it also abuts the respective ends 35 of each tube 34 and at the same time closely surrounds the offset portion 40 of the end members 36 as do the ends 35 of the tube 34. The respective abutting joints between sleeve 41 and the other resilient members may be cemented with any suitable adhesive if desired. Similarly, the overlapped or telescoped portions between the respective end members 36 and ends 35 of the respective tube 34 and between the overlapped portions in telescoped surfaces of the respective closed ends 39 of the end members 36 and the resilient sleeve 41 may be cemented by a suitable adhesive if desired. Normally, only the edge joints between resilient sleeve 41 and the abutting resilient members will be so cemented at the time of assembly.

Supporting plate 31 is provided with drilled openings 42 through which stem 40 projects. An integral bead 43 may be molded on the end members 36 to provide a flexible clamping pressure against the outside of plate 31.

Figure 6:
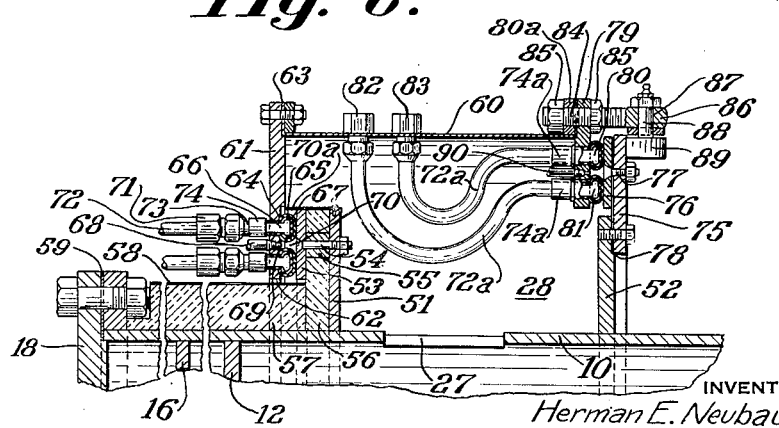
Figure 6 is a further enlarged view of the upper portion of the seal construction shown in Figure 5, taken along line VI—VI of Figure 5A.
Figure 5A:
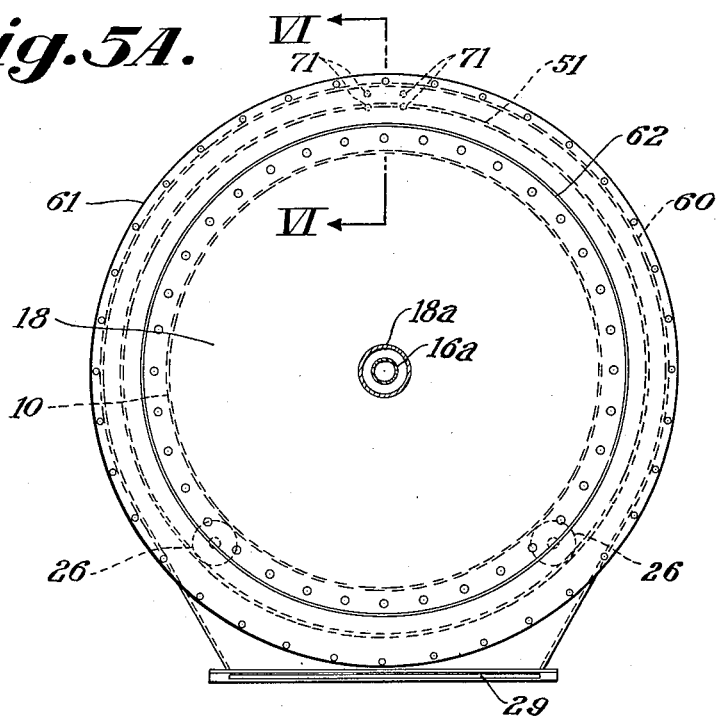
Figure 5A is an end view in elevation on a reduced scale of the outlet or discharge end of the rotary dryer shown in Figure 1.

A piece of metal tubing 44 may be inserted in each stem 40 and clamped thereto by a conventional adjustable hose clamp 45. The outer end of tubing 44 is provided with a fitting 46 for attachment to a fluid circulation pipe 46a (not fully illustrated). Another pipe 47 communicates with the space 48 between the sealing enclosures defined by the space between the respective tubes 44 and resilient sleeves 41 so that an inert gas such as nitrogen may be supplied to the space 48. The tubes 34 with the resilient sleeve 41 and the end members 36 normally bear against wear plate 33 and effect a seal. Insurance of that seal may be provided by circulating a fluid through the respective sealing enclosures. Thus, as shown in Figure 6, if a fluid such as water is fed into one of the pipes 44, it will pass around the entire sealing enclosure in question and exit through the other pipe 44. The pressure of such fluid can be set at any predetermined amount to cause the respective tube 34 and resilient sleeve 41 to bear against wear plate 33 and supporting plate 31 with whatever force is required to make the seal effective.

At the same time, the closed ends 39 of the respective end members 36 will press against each other in a plane at right angles to the axis of the closed end portions 39 under the influence of the same pressure. In this way, there will be no "break" in the sealing enclosure adjacent the ends of the tubes where the connections are made and led beyond the joint defined by the opposed surfaces of plates 31 and 33. Moreover, although each of the concentric sealing enclosures shown in Figures 2 to 4 inclusive comprise a single length of tube 34 with two end members 36 and one resilient sleeve 41, it is evident that each such sealing enclosure may be similarly made using a plurality of such assemblies, each covering its particular arc or length of the entire sealing enclosure.

In some cases, even though the opposed surface of wear plate 33 against which the sealing enclosures bear is highly polished, objectionable friction may exist between the wear plate and the sealing enclosure comprising the assembly of the resilient tube 34, end members 36 and resilient sleeve 41, even though such opposed surface is chromium plate. In those cases, it may be desirable to cement a layer of fabric 49 of long wearing quality made of a material such as nylon or "Orlon" or "Vinyon," to the portion of the exterior of the respective tubes 34 and resilient sleeves 41 to bear against the wear plate 33 with a reduced coefficient of friction. The added advantage of the fabric is that it prevents the wear of the resilient tubes and can be replaced whenever necessary. Further, the fluid circulated through the interior of the respective sealing enclosures may be at a temperature low enough to cool the sealing enclosure, a teaching which is set forth and claimed in United States application, Serial No. 187,112, filed September 27, 1950, in the name of Herbert L. Barnebey for "Gasket Sealing and Cooling System," now Patent No. 2,691,460 issued October 12, 1954.

The supplying of inert gas to the double concentric sealing enclosure embodiment set forth in Figures 2 to 4 inclusive through the pipe 47 at a pressure slightly greater than the pressure maintained in the drum is an added measure to prevent trouble, for example, the case of the presence in drum 10 of an atmosphere of a potentially explosive or inflammable quality. Thus, the double sealing enclosure shown in those figures is not only dustproof but also vaporproof and prevents any contamination of the substances within drum 10 as well as any escape of those substances through the seal construction of this invention. An annular shield 50 is fastened to cover 21 and flares inwardly toward the outer edge of plate 31 to substantially cover the space between the plates 31 and 33 and thereby protect the seal construction.

Adjacent the outlet end of drum 10, a pair of annular flanges 51 and 52 are welded in spaced relation to each other and to the longitudinal ends of the discharge ports 27. A wear plate 53 is bolted to flange 51 by a series of machine bolts 54 having countersunk heads and spaced from flange 51 by spacers 55 and insulation 56. Additional insulation 57 covered by a cylindrical cover 58 is provided at the outlet end above the spaces respectively between sheet 12 and header 16 and between header 16 and cover 18. A gasket 59 between cover 18 and the body of drum 10 maintains a conventional vapor seal at that end.

A discharge housing 28 comprises a generally cylindrical sheet metal shell 60 leading to the discharge opening 29. The outward side of housing 28 comprises a plate 61 which also serves as a supporting ring and which is provided with a central opening 62 through which the outlet end of drum 10 extends. Plate 61 is bolted to a flange around the adjacent edge of the shell 60 and a gasket 63 is used to seal that connection. A pair of concentric sealing enclosure grooves 64 are provided around the annular face of plate 61 in opposed relation to wear plate 53. Sealing enclosures are cemented to each groove 64 and comprise a resilient tube 65, a pair of end members 66 and a resilient sleeve 67 similar in construction and functioning to the sealing enclosures illustrated in Figures 2 to 4 inclusive. Likewise, the supporting plate 61 in groove 64 and wear plate 53 are similar to the corresponding parts described in the seal construction illustrated in those figures.

A pipe 68 is screwed into plate 61 between the double sealing enclosures and supplies inert gas through an opening 69 to the space 70 between the two sealing enclosures in the same manner and for the same purpose as previously described in connection with the sealing enclosures at the feed or inlet end of drum 10. A cylindrical shield 70a is fastened to the outermost edge of flange 51 and extends so as to substantially cover the space between wear plate 53 and the opposed surface portion of plate 61 outwardly of the sealing enclosures to protect them. Fluid is supplied to the interior of the respective sealing enclosures through the fittings 71 and tubing 72, which tubing is fastened inside of the stems 73 of the end members 66 by the conventional adjustable hose clamps 74. Again, these last-mentioned members are similar in general construction and purpose to the corresponding parts described in connection with the seal construction at the inlet end of drum 10.

An annular extension plate 75 is bolted to flange 52 and in turn a wear plate 76 is bolted to plate 75 by machine bolts 77 having countersunk heads. An asbestos gasket 78 extends between flange 52 and plate 75 and also between plates 75 and 77, not only sealing the connections they make but preventing the undue transmission of heat to wear plate 76. A supporting plate 79 is bolted in sealed relation to a flange 80a around the inner peripheral edge of discharge housing shell 60. Supporting plate 79 supports concentric sealing enclosures 80 and 81 similar in all respects to those applied to the other side of the discharge housing and supported by the plate 61. Thus, the respective sealing enclosures 80 and 81 are provided with beaded portions on the end members thereof similar to the beaded portions of the end member 66 and of the members 36. And tube 72a corresponding to tubing 72 and to tubing 44 is connected to the respective end members of the sealing enclosures 80 and 81 by conventional hose clamps 74a. The tubing 72a for the sealing enclosures 80 and 81 is connected to fittings 82 and 83, respectively, which are fastened to shell 60 and extend therethrough in sealed relation for connection to the respective fluid circulation pipes (not illustrated).

Bolts 84 which fasten plates 79 to flange 80 by means of nuts 85 are provided with an eye 86 having a drilled opening 87 therein in which a roller shaft 88 is mounted. Roller shaft 88 supports a roller 89 which bears against the outermost edge of the annular plate 75. Thus, as drum 10 rotates rotating plates 75 and 76, the maintenance of the spacing between plates 76 and 79 is assisted and the stability of the operation of the equipment aided by the provision of the rollers 89 bearing against the plate 75. A pipe 90 is also provided through which an inert gas may be supplied in the same manner as in the case of pipe 68, to the space between sealing enclosures 80 and 81. Then, as the drum rotates and dry material falls through the ports 27, it will pass out through discharge opening 29 while the sealing enclosures 65—66—67 and 80 and 81 will maintain a dustproof and vaporproof seal between the respective rotating wear plates and non-rotating supporting plates. Wear plate 76 like wear plate 53 will be highly polished or chromium plated to reduce friction. Moreover, the sealing discharge or outlet end of the equipment may be covered with a fabric having a relatively low coefficient of friction on that portion of the surface which may come in contact with those wear plates to reduce such friction. Fluid will also normally be circulated through such sealing enclosures in the same manner and for the same purpose as described in connection with the sealing enclosures at the inlet end of drum 10. The fluid outlets for the respective sealing enclosures will normally be protected against any siphon action therein which might reduce the pressure at any place along the sealing enclosure below atmospheric. Inasmuch as, as a general rule, no appreciable pressure differential exists between the interior and exterior of such rotary dryers, the only head which normally will be required when a fluid such as water is so circulated will be that necessary to maintain circulation.

Figure 7:
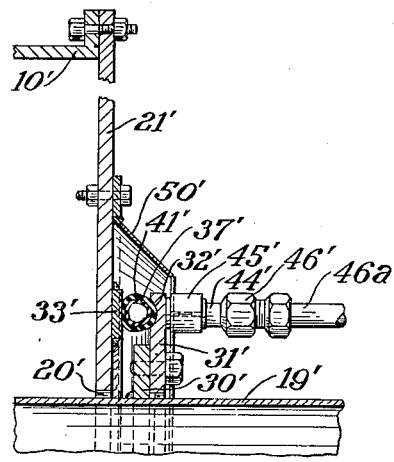
Figure 7 is an enlarged view of a modified embodiment of a seal construction of this invention used at the feed end of a rotary dryer of the tubular type.
Figure 8:
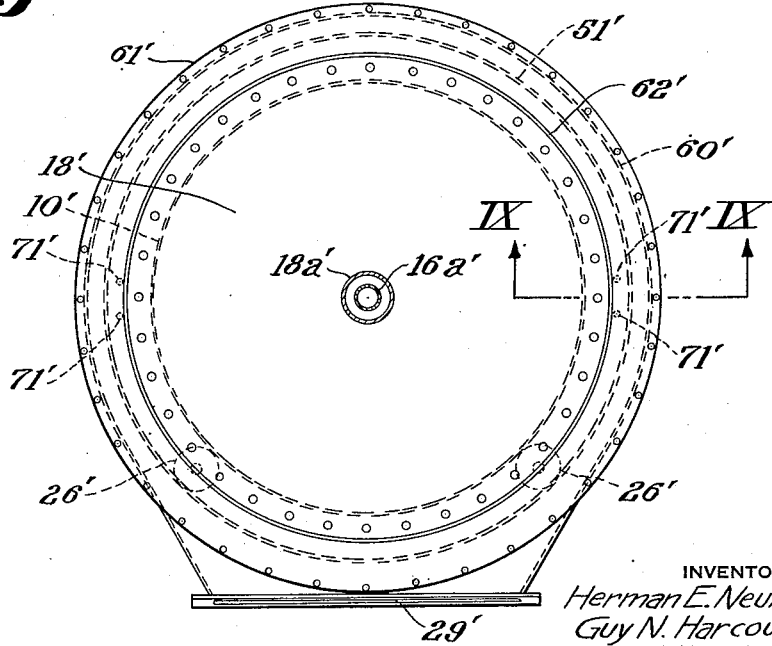
Figure 8 is an end view in elevation on a reduced scale of the discharge end of a rotary dryer of the tubular type to which the modified embodiment of Figure 7 has been applied.

In the modification shown in Figures 7 and 8, a seal construction of this invention is applied to a rotary dryer with rotating drum with a single sealing enclosure around the inlet opening and around the openings at the sides of the discharge housing. In general construction and functioning this sealing enclosure and the associated elements are the same as those illustrated in respect of the embodiment set forth in Figures 2 to 4 inclusive except that but a single rather than a double such enclosure is provided. Accordingly, the same reference numerals with the additions of primes have been applied to the modified embodiment illustrated in Figures 7 and 8 as have been applied to the embodiment illustrated in Figures 2 to 4 inclusive. As is evident this modification provides no space corresponding to the space 48 and no inert gas is supplied inwardly of the modified sealing embodiment. Nevertheless, it serves as an efficient and effective seal between the rotating and non-rotating parts of the equipment both to exclude dust and foreign matter from the interior of the drum 10′ and to keep any of the substances within the drum 10′ or the discharge housing 28′ associated therewith from getting out into the atmosphere surrounding the equipment. Although each of the resilient tubes in the sealing enclosures illustrated in Figures 1 to 6 inclusive extends around the entire 360° of the enclosure, in the modification illustrated in Figures 7 to 9, each of the sealing enclosures is in two parts, each of which extends around 180° of the complete sealing enclosure, as shown by the fittings 71′ in Figure 8. Each such complete sealing enclosure therefore comprises a total of two resilient tubes, four resilient hollow end members and two resilient sleeves in end-to-end alignment with the resilient sleeves utilized as shown in Figure 4 by covering abutting closed end portions of end members respectively associated with the adjacent ends of the two resilient tubes. Further, although these various members of the sealing enclosure are preferably resilient, under some circumstances flexible materials which can be formed into hollow tubular shapes may be used in place thereof in the seal construction of this invention.

A further modification of this invention is illustrated in Figure 10 applied to the discharge housing assembly of a rotary dryer of the vacuum type with rotating cylindrical chamber. Thus, for example, a rotatable drum with jacket 100 is provided on each side with a discoidal or annular flange 101 inwardly of the sides 102 of a generally cylindrical discharge housing 103. A wear plate 104 is attached to flange 101 by a series of machine bolts 105 having countersunk heads in spaced relation thereto as provided by the spacer sleeves 106 and the lagging 107. A supporting plate 108 is bolted by bolts 115 to an interior flange 109 on each side 102. Whenever it may be desirable to inspect or replace the sealing enclosure 110, the bolts 115 can be removed. Thereupon, plate 108 can be moved away from housing 103 for such inspection or replacement.

Supporting plate or ring 108 is provided with a sealing enclosure 110 constructed in accordance with this invention. Sealing enclosure 110, the wear plate 104 and supporting plate 108 and the fluid connections comprising the fitting 111, tubing 112 and hose clamp 113 are similar in construction and functioning to the modified embodiment illustrated in Figures 7, 8 and 9. A cover strip or shield 114 is attached to the outer edge of flange 101 and extends so as to substantially cover the space between the plates 104 and 108 and thus protect the sealing enclosure 110. Again, sealing enclosure 110 may be provided with a cover material having a relatively low coefficient of friction on that portion thereof which may come into contact with the bearing surface of wear plate 104.

In the modification of Figure 11, a rotating cylindrical surface 116 may be provided, the outer surface of which constitutes a wear plate. A stationary cylindrical surface 117 may be positioned coaxially with respect to the cylinder 116. In such case the inner surface of cylinder 117 opposite the wear portion of cylinder 116 would constitute a supporting plate. A resilient tube 118 of resilient material might be provided in circular form having two ends 119 in abutting relation between two circular openings 120 through cylinder 117. These openings 120 are adapted to accommodate stems 121 vulcanized to corresponding openings in the tube 118 adjacent the respective ends 119 thereof. An imperforate resilient cylindrical plug 122 fits into each end 119 of the tube 118 and is preferably cemented to one of the said ends around the interior surface thereof. By such means, the circulation of a fluid in one of the stems 121 and out the other will radially expand the tube 118 and plug 122 and provide a complete sealing enclosure between the opposed surfaces on the cylinders 116 and 117. Since the resilient tube 118 will usually be of an oval cross section, the major axis of which is parallel to the axis of the cylinders 116 and 117, the circulation of fluid therethrough tends to change that cross section to a circular one and produces the intensity of sealing pressure desired. In some cases it may be possible to fill tube 118 with a spring under compression bearing against the respective ends of plug 122 to effect a complete sealing enclosure. In such cases, fluid circulation would only be required if additional sealing pressure between the respective surfaces were desired.

Various modifications may be made in the details and applications of this invention without departing from the spirit thereof or the scope of the appended claims.

We claim:

1. In a seal construction of relatively uniform cross section for rotary equipment, in combination, relatively rotating ringlike opposed surfaces, a finite length of resilient tube secured to one of said surfaces with its ends open and in aligned relation, said resilient tube bearing upon the other of said surfaces, a pair of three-legged resilient members, each open end of said resilient tube having inserted therein one of said three-legged members, one leg of each of said members so inserted being in open communication with the interior of said tube through another leg thereof for circulation of a pressurized fluid therethrough, another leg of each of said members being closed and in abutting alignment respectively to complete a closed path resilient seal with said tube, and a resilient sleeve fitted over and maintaining said closed legs in abutting alignment thereby completing a closed path sealing enclosure with said tube.

2. In a seal construction of relatively uniform cross section for rotary equipment, in combination, relatively rotating annular opposed surfaces defining an opening to be sealed, an annular groove in one of said surfaces, a resilient tube of finite length fastened in said groove and extending toward the other of said opposed surfaces to bear thereagainst, said resilient tube having its ends open and in spaced aligned relation, a plural legged resilient member having one open leg inserted in one open end of said tube, a second plural legged resilient member having one open leg inserted in the other open end of said resilient tube, another leg of each of said members being in open communication with said one open leg and the interior of said tube for circulation of a pressurized fluid therethrough, each of said members having a closed portion, said closed portions being in abutting alignment with said one open leg of each of said members respectively to seal the space between the ends of said resilient tube and complete a closed path sealing enclosure with said tube, and a resilient sleeve surrounding said portions of each of said members to maintain said portions in abutting alignment with said tube thereby completing said closed path sealing enclosure.

3. In a seal construction of relatively uniform cross section for rotary equipment having a member, in combination, a ringlike wear plate connected to said member, a supporting ring in spaced opposed relation to said wear plate, said member and ring being relatively rotatable, a resilient tube of finite length fastened to said supporting ring, said resilient tube having two open ends in alignment substantially forming a sealing enclosure between said supporting ring and said wear plate, a resilient hollow end member having a portion adapted to be placed in alignment with said sealing enclosure, said portion having an open and a closed end, said open end being inserted in the open end of said resilient tube, said closed end of said portion of the respective hollow resilient end member being in back-to-back aligned relation along said sealing enclosure with the closed end of another of such end members connected to the other end of said resilient tube, and a duct connected to each of said end members extending away from said sealing enclosure, whereby a fluid is adapted to be circulated through said ducts and members and resilient tube to seal said opening between said supporting ring and said wear plate.

4. In a seal construction of relatively uniform cross section for rotary equipment, in combination, a ringlike wear plate, a supporting ring in spaced opposed relation to said wear plate, said member and ring being relatively rotatable and defining a continuous opening therebetween, a plurality of resilient tubes of finite lengths fastened to said supporting ring in concentric relation to each other and adapted to press against said wear plate, each of said resilient tubes having its open ends in spaced alignment respectively, a substantial part of a sealing enclosure being defined by said respective tubes, a plurality of hollow branched end members each having an aligned portion and an offset portion, said aligned portion having a closed end and an open end, said open end of one of said members being adapted to be inserted into an open end of one of said resilient tubes and to have the closed end thereof adapted to abut the closed end of another of said members similarly inserted in the other open end of each of said tubes to provide a closed path with each of said tubes and complete a sealing enclosure, said offset portion of each of said respective hollow end members being in open communication with the interior thereof and of the resilient tube connected thereto for circulation of a pressurized fluid through the interior of said members and tubes respectively.

5. In a seal construction of relatively uniform cross section for rotary equipment, in combination, a wear plate connected to the exterior of said equipment generally equidistant from the axis thereof, a continuous supporting member in spaced opposed relation to said wear plate, said wear plate and supporting member being relatively rotatable and defining a continuous opening therebetween, a resilient tube of finite length adhering to said supporting ring and adapted to press against said wear plate to substantially define a sealing enclosure for said opening, said resilient tube having its two ends open and in spaced alignment, a resilient hollow branched end member having an open end portion in telescopic relation with each open end of said tube, said respective open end portions extending along the path of said sealing enclosure and terminating in a closed end in abutment with each other, an offset portion in each of said end members in communication with the interior thereof respectively to effect fluid circulation through said tube, a resilient sleeve surrounding said abutting closed ends of said end members to complete the sealing enclosure, and a sealing enclosure shield connected to said equipment and extending so as to substantially cover the space between said wear plate and supporting member exteriorly of said sealing enclosure.

6. In a seal construction of relatively uniform cross section for rotary equipment, in combination, a smooth wear plate connected to the exterior of said equipment generally equidistant from the axis thereof, a continuous supporting member in spaced opposed relation to said wear plate, said wear plate and supporting member being relatively rotatable and defining a continuous opening therebetween, a groove in said member, a resilient tube adhering to said groove and adapted to press against said wear plate to substantially define a sealing enclosure for said opening, said resilient tube being of finite length and having its ends open and in spaced alignment, a pair of resilient hollow branched end members having an open end portion in telescopic relation with an end respectively of said tube, said respective open end portions extending along the path of said sealing enclosure and terminating in a closed end in abutment with each other, an offset portion in each of said end members in communication with the interior thereof respectively to effect fluid circulation through said tube, a resilient sleeve having an outside diameter approximately equal to that of said resilient tube and surrounding said abutting closed ends of said end members to complete the sealing enclosure, and a layer of wear resisting material such as nylon of a lower coefficient of friction than said tube affixed to said resilient tube between the same and said wear plate.

7. In a seal construction of relatively uniform cross section for rotary equipment having relatively rotatable members, in combination, a wear plate connected to one of said members, a supporting ring in spaced opposed relation to said wear plate connected to the other of said members, said wear plate and ring defining a continuous opening therebetween, a plurality of flexible tubes connected to said ring in concentric relation, each tube contacting said wear plate and forming a sealing enclosure therewith, said tubes respectively having their ends in spaced alignment along each sealing enclosure defined by said respective tubes, a plurality of hollow branched end members having an aligned portion and an offset portion, said aligned portion having a closed end and an open end, said open end being adapted to be inserted into one of the ends of said tubes respectively, the closed ends thereof in each sealing enclosure being in aligned back-to-back abutting arrangement blocking any endless passage through said seal, said offset portions of said respective hollow end members being in open communication with the interiors thereof and of the tubes connected thereto for circulation of a pressurized fluid therethrough, and means for supplying an inert fluid to the space between said sealing enclosures.

References Cited in the file of this patent

UNITED STATES PATENTS

| Number | Name | Date |
|---|---|---|
| 501,715 | Hardwick | July 18, 1893 |
| 890,252 | Thompson | June 9, 1908 |
| 892,765 | Seebeck | July 7, 1908 |
| 1,674,038 | Glass | June 19, 1928 |
| 1,803,665 | Dennis | May 5, 1931 |
| 1,966,202 | Pfefferle | July 10, 1934 |
| 2,063,368 | La Roza | Dec. 8, 1936 |
| 2,356,778 | Morrison | Aug. 29, 1944 |
| 2,360,345 | Hilkemeier | Oct. 17, 1944 |
| 2,385,627 | Jones | Sept. 25, 1945 |
| 2,396,212 | Spanel | Mar. 5, 1946 |
| 2,402,224 | Hornbostel | June 18, 1946 |